US012683156B2

(12) United States Patent
Kim et al.

(10) Patent No.: US 12,683,156 B2
(45) Date of Patent: Jul. 14, 2026

(54) CATHODE FOR LITHIUM SECONDARY BATTERY AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: Jung Hwan Kim, Daejeon (KR); Dong Wook Ha, Daejeon (KR); Soo Min Park, Daejeon (KR); Sang Han Lee, Daejeon (KR); Jong Hyuk Lee, Daejeon (KR); In Haeng Cho, Daejeon (KR)

(73) Assignee: SK On Co., Ltd., Seoul (KR)

( * ) Notice: Subject to any disclaimer, the term of this patent is extended or adjusted under 35 U.S.C. 154(b) by 665 days.

(21) Appl. No.: 18/094,099

(22) Filed: Jan. 6, 2023

(65) Prior Publication Data

US 2023/0223531 A1 Jul. 13, 2023

(30) Foreign Application Priority Data

Jan. 7, 2022 (KR) ........................ 10-2022-0002901

(51) Int. Cl.
*H01M 4/525* (2010.01)
*H01M 4/38* (2006.01)
(Continued)

(52) U.S. Cl.
CPC ........... *H01M 4/525* (2013.01); *H01M 4/386* (2013.01); *H01M 10/052* (2013.01); *H01M 2004/021* (2013.01)

(58) Field of Classification Search
CPC .... H01M 4/525; H01M 4/386; H01M 10/052; H01M 2004/021; H01M 2004/028;
(Continued)

(56) References Cited

U.S. PATENT DOCUMENTS

2016/0149205 A1 5/2016 Theivanayagam et al.
2020/0303716 A1* 9/2020 Monismith ........... H01M 4/134
(Continued)

FOREIGN PATENT DOCUMENTS

KR 10-2015-0010556 A 1/2015
KR 10-1557549 B1 10/2015
(Continued)

OTHER PUBLICATIONS

Extended European Search Report on the European Patent Application No. 22217277.7 issued by the European Patent Office on Jun. 28, 2023.

*Primary Examiner* — Michael Y Sun
(74) *Attorney, Agent, or Firm* — IP & T GROUP LLP

(57) ABSTRACT

A cathode for a lithium secondary battery according to embodiments of the present invention includes a cathode current collector, and a cathode active material layer formed on the cathode current collector. The cathode active material layer includes first lithium metal oxide particles each having a secondary particle shape in which primary particles are aggregated and second lithium metal oxide particles each having a single particle shape. A cross-section of the cathode active material layer from an SEM satisfies Equations 1 and 2.

15 Claims, 2 Drawing Sheets

(51) Int. Cl.
　　*H01M 10/052* 　　　(2010.01)
　　*H01M 4/02* 　　　　(2006.01)
(58) Field of Classification Search
　　CPC .... H01M 4/131; H01M 4/1391; H01M 4/362;
　　　　　　H01M 4/02; H01M 10/0525; H01M
　　　　　　4/366; H01M 4/485; H01M 4/483; Y02E
　　　　　　60/10
　　See application file for complete search history.

(56) References Cited

U.S. PATENT DOCUMENTS

| | | | |
|---|---|---|---|
| 2021/0013508 A1 | 1/2021 | Kuroda | |
| 2021/0313563 A1* | 10/2021 | Guo ...................... | H01M 4/364 |
| 2022/0393165 A1* | 12/2022 | Tochio ................. | H01M 4/525 |

FOREIGN PATENT DOCUMENTS

| | | |
|---|---|---|
| KR | 10-2019-0143088 A | 12/2019 |
| KR | 10-2021-0052320 A | 5/2020 |
| KR | 10-2020-0070649 A | 6/2020 |
| KR | 10-2293034 B1 | 8/2021 |
| KR | 10-2021-0150863 A | 12/2021 |

* cited by examiner

100

110
105

SKI 5.0kV 8.3mm x1.00k SE(UL)                    50.0µm

150

107

106

127

126

140

110
105  } 100
110

120
125  } 130
120

160

CATHODE FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2022-0002901 filed on Jan. 7, 2022 in the Korean Intellectual Property Office (KIPO), the entire disclosure of which is incorporated by reference herein.

BACKGROUND

1. Field

The present invention relates to a cathode for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc.

A lithium secondary battery is highlighted due to high operational voltage and energy density per unit weight, a high charging rate, a compact dimension, etc.

For example, the lithium secondary battery includes an electrode assembly including a cathode, an anode and a separator interposed between the cathode and the anode, and an electrolyte for impregnating the electrode assembly.

The cathode may include a cathode current collector and a cathode active material layer formed on the cathode current collector. For example, the cathode active material layer may include lithium metal oxide particles as a cathode active material.

The lithium metal oxide particles may have a form of a secondary particle in which a plurality of primary particles are aggregated.

When the lithium metal oxide particle is repeatedly charged and discharged of the lithium secondary battery, cracks may occur within the particle due to intercalation and deintercalation of lithium. Further, cracks may occur due to a particle breakage during a pressing in a cathode manufacturing process.

Accordingly, generation of gas and deterioration of life-span may be caused due to a side reaction between the lithium metal oxide particles and the electrolyte in the lithium secondary battery. The above-mentioned defects may be further increased in a high temperature environment.

For example, Korean Published Patent Application No. 10-2021-0052320 discloses a method of improving life-span properties of a lithium secondary battery by employing lithium metal oxide particles having different particle sizes.

SUMMARY

According to an aspect of the present invention, there is provided a cathode for a lithium secondary battery having improved life-span property at high temperature.

According to an aspect of the present invention, there is provided a lithium secondary battery having improved life-span property at high temperature.

A cathode for a lithium secondary battery includes a cathode current collector and a cathode active material layer formed on the cathode current collector. The cathode active material layer includes first lithium metal oxide particles each having a secondary particle shape in which primary particles are aggregated and second lithium metal oxide particles each having a single particle shape, and satisfies Equations 1 and 2.

$$40 \leq [A_2/(A_1+A_2)] \times 100 \leq 98 \qquad \text{[Equation 1]}$$

$$A_C/A_1 \times 100 \leq 2 \qquad \text{[Equation 2]}$$

In Equations 1 and 2, $A_1$ is an area of the first lithium metal oxide particles measured from a scanning electron microscope (SEM) cross-sectional image of the cathode active material layer, $A_2$ is an area of the second lithium metal oxide particles measured from the SEM cross-sectional image, and $A_C$ is an area of cracks in the first lithium metal oxide particles measured from the SEM cross-sectional image.

In some embodiments, each of the first lithium metal oxide particles and the second lithium metal oxide particles may contain nickel, and a concentration of nickel in the first lithium metal oxide particles may be greater than a concentration of nickel in the second lithium metal oxide particles.

In some embodiments, a difference between the concentrations of nickel in the first lithium metal oxide particles and the second lithium metal oxide particles may be in a range from 1 mol % to 20 mol %.

In some embodiments, the concentration of nickel in the first lithium metal oxide particles may be 85 mol % or more based on a total number of moles of all elements except for lithium and oxygen.

In some embodiments, an average particle diameter of the first lithium metal oxide particles may be in a range from 10 μm to 20 μm, and an average particle diameter of the second lithium metal oxide particles may be in a range from 3 μm to 10 μm.

In some embodiments, a ratio of an average particle diameter of the second lithium metal oxide particles relative to an average particle diameter of the first lithium metal oxide particles may be in a range from 0.2 to 0.5.

In some embodiments, a specific surface area of the first lithium metal oxide particles may be in a range from 0.3 $m^2/g$ to 1.3 $m^2/g$, and a specific surface area of the second lithium metal oxide particles may be in a range from 0.1 $m^2/g$ to 1 $m^2/g$.

In some embodiments, a ratio of specific surface areas of the second lithium metal oxide particles relative to the first lithium metal oxide particles may be in a range from 0.3 to 1.3.

In some embodiments, a hardness ratio of the second lithium metal oxide particles relative to the first lithium metal oxide particles is in a range from 1.5 to 2.5.

In some embodiments, the cathode may have an electrode density of 3.5 g/cc or more.

In some embodiments, $[A_2/(A_1+A_2)] \times 100 > 50$.

In some embodiments, $A_C/A_1 \times 100 < 1$.

A lithium secondary battery includes the cathode according to the above-described embodiments and an anode facing the cathode.

In some embodiments, the anode may include an anode current collector and an anode active material layer formed on at least one surface of the anode current collector, and the anode active material layer may include a silicon-based active material.

In some embodiments, a content of silicon atoms may be in a range from 1 wt % to 20 wt % based on a total weight of the anode active material layer.

A cathode according to exemplary embodiments includes first lithium metal oxide particles having a secondary particle structure and second lithium metal oxide particles having a single particle structure, and may satisfy the above-Equations 1 and 2 described below. Accordingly, high-temperature life-span properties of the lithium secondary battery may be improved while suppressing gas generation at high temperature.

A lithium secondary battery according to exemplary embodiments may include the cathode, so that high-temperature life-span characteristics may be improved and an amount of gas generation at high temperature may be reduced.

DETAILED DESCRIPTION OF THE EMBODIMENTS

According to embodiments of the present invention, a cathode for a lithium secondary battery including cathode active material particles is provided. Further, a lithium secondary battery including the cathode is also provided.

Hereinafter, the present invention will be described in detail with reference to exemplary embodiments and the accompanying drawings. However, those skilled in the art will appreciate that such embodiments are provided to further understand the spirit of the present invention and do not limit subject matters to be protected as disclosed in the detailed description and appended claims.

Figure 1:
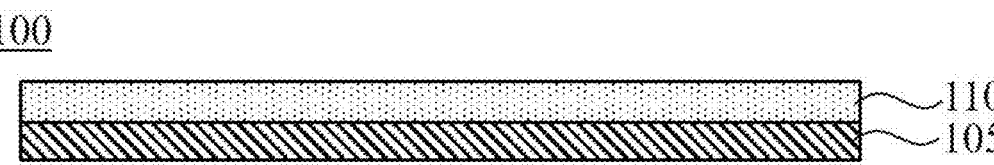
FIG. 1 is a schematic cross-sectional view of a cathode for a lithium secondary lithium battery in accordance with exemplary embodiments.
Figure 2:
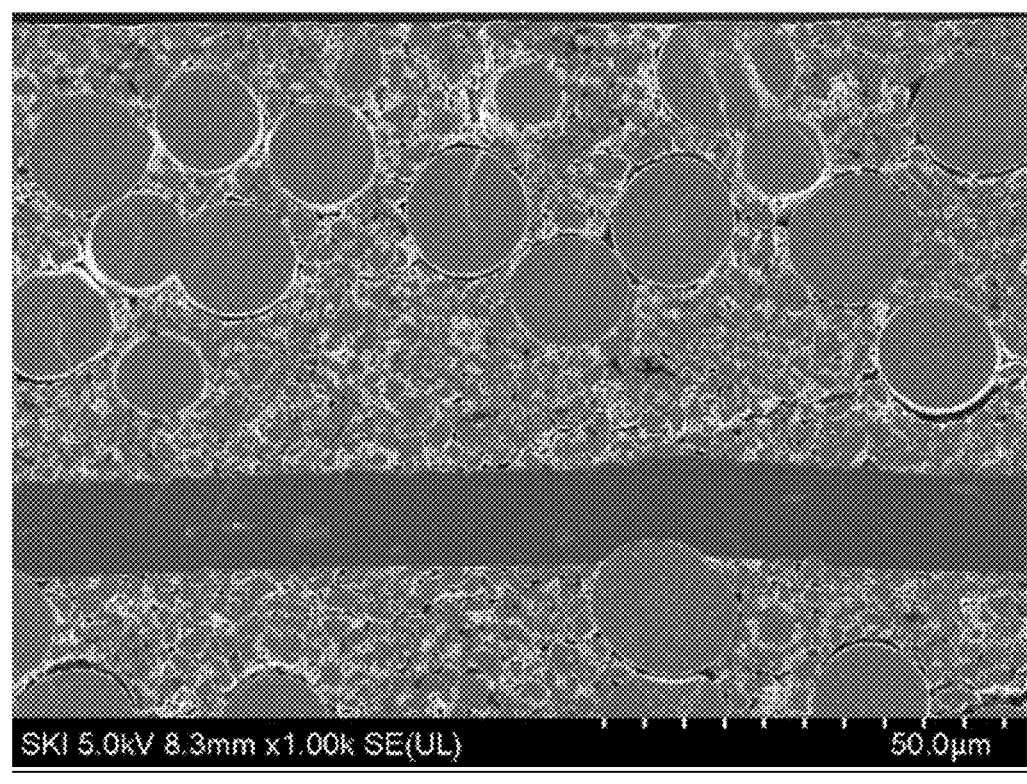
FIG. 2 is a scanning electron microscope (SEM) image of a cross-section of a cathode active material in Example 1.

FIG. 1 is a schematic cross-sectional view of a cathode for a lithium secondary lithium battery in accordance with exemplary embodiments.

Referring to FIG. 1, a cathode 100 for a lithium secondary battery may include a cathode current collector 105 and a cathode active material layer 110 formed on at least one surface of the cathode current collector.

For example, the cathode active material layer 110 includes a cathode active material, and may further include a cathode binder and a conductive material.

For example, the cathode active material, the cathode binder and the conductive material may be dispersed in a solvent to prepare a cathode slurry, and then the cathode slurry may be coated on the cathode current collector 105, dried and pressed to from the cathode 100.

For example, the cathode current collector 105 may include stainless steel, nickel, aluminum, titanium, copper, or an alloy thereof.

The cathode active material includes first lithium metal oxide particles each having a secondary particle shape, and second lithium metal oxide particles each having a single particle shape.

For example, the secondary particle and the single particle may be distinguished by a morphology of the particle. For example, the particles may be classified based on cross-sectional images of the particles measured by a scanning electron microscope (SEM).

For example, the secondary particle may refer to a particle that is substantially considered or observed as one particle by aggregation of a plurality of primary particles. For example, the secondary particle may be formed by an aggregation of more than 10, 30, 50, or 100 primary particles.

For example, the single particle may be distinguished from the secondary particle and may also include a monolithic particle other than an aggregate. However, the single particle does not exclude a form in which fine particles (e.g., particles having a volume of $\frac{1}{100}$ or less of a volume of the single particle) are attached to the particle surface.

For example, in the cathode active material layer 110, the single particles may be present in contact with each other. The form in which the single particles are in contact with each other and the form of the secondary particle can be distinguished and may be confirmed through SEM images. For example, 2 to 10 single particles may be present in contact with each other.

The particles are not distinguished in a crystallographic aspect. Accordingly, the primary particle and the single particle may be a single crystal or a polycrystal in a crystallographic aspect.

The cathode active material layer 110 satisfies Equation 1 below.

$$40 \leq [A_2/(A_1+A_2)] \times 100 \leq 98 \qquad \text{[Equation 1]}$$

In Equation 1, $A_1$ is an area of the first lithium metal oxide particles (i.e., the secondary particle) measured from an SEM cross-sectional image of the cathode active material layer 110, and $A_2$ is an area of the second lithium metal oxide particles (i.e., the single particle) measured from the SEM cross-sectional image.

The cathode active material layer 110 satisfies Equation 2 below.

$$A_C/A_1 \times 100 \leq 2 \qquad \text{[Equation 2]}$$

In Equation 2, $A_1$ is the area of the first lithium metal oxide particles (i.e., secondary particles) measured from the SEM cross-sectional image of the cathode active material layer 110, and $A_C$ is an area of cracks in the first lithium metal oxide particles measured from the SEM cross-sectional image.

For example, $A_1$ may refer to a total area within a circumference of the secondary particle. For example, $A_1$ may include the area of cracks in the secondary particles that is indicated as $A_C$.

For example, in a pressing process during a fabrication of the cathode, the secondary particles may be damaged to generate cracks at insides of the primary particles, or the primary particles may be separated from each other to generate cracks. For example, when the lithium secondary battery is repeatedly charged and discharged, cracks may occur by the separation between the primary particles due to intercalation and deintercalation of lithium. $A_C$ may refer to a total area of the cracks.

When the cathode active material layer 110 satisfies Equation 1 and Equation 2 above, the lithium secondary battery having improved capacity, power, high-temperature capacity retention may be provided while suppressing a gas generation at high-temperature.

For example, if the value of Equation 1 is less than 40, the gas generation at high-temperature in the lithium secondary battery may increase. When the value of Equation 1 exceeds 98, the capacity, output and high-temperature capacity retention of the lithium secondary battery may be degraded.

For example, if the value of Equation 2 exceeds 2, the high-temperature capacity retention of the lithium secondary battery may be decreased and the amount of gas generation at high temperature may be increased.

For example, the values of Equation 1 and Equation 2 may be controlled by various factors such as a particle diameter, a specific surface area, a particle hardness, a nickel content, a mixing ratio of the first lithium metal oxide particle and the second lithium metal oxide particle, etc.

In some embodiments, the value of Equation 1 may be 50 or more, 60 or more, or 70 or more. Within this range, the high-temperature life-span properties of the lithium secondary battery may be further improved, and the amount of gas generation at high temperature may be further reduced.

In some embodiments, the value of Equation 1 may be 95 or less.

In an embodiment, the value of Equation 2 may be 1.5 or less, preferably 1 or less, and more preferably 0.7 or less. Within the above range, the amount of gas generation at high temperature in the lithium secondary battery may be further reduced.

In some embodiments, the value of Equation 2 may be 0.1 or more, 0.2 or more, or 0.3 or more. Within the above range, the high-temperature capacity retention of the lithium battery may be further improved.

In an embodiment, an average particle diameter (D50) of the first lithium metal oxide particles may be in a range from 10 $\mu$m to 20 $\mu$m. In some embodiments, the average particle diameter of the primary particles may be in a range from 0.5 $\mu$m to 5 $\mu$m.

The term "average particle diameter" or "D50" as used herein may refer to a particle diameter when a volume cumulative percentage corresponds to 50% in a particle size distribution obtained from a particle volume.

In an embodiment, an average particle diameter of the second lithium metal oxide particles may be in a range from 3 $\mu$m to 10 $\mu$m.

In an embodiment, a ratio of the average particle diameter of the second lithium metal oxide particles relative to the average particle diameter of the first lithium metal oxide particles may be in a range from 0.15 to 1, preferably from 0.2 to 0.5, more preferably from 0.31 to 0.46.

In an embodiment, a specific surface area of the first lithium metal oxide particles may be in a range from 0.3 $m^2/g$ to 1.3 $m^2/g$. A specific surface area of the second lithium metal oxide particles may be in a range from 0.1 $m^2/g$ to 1.0 $m^2/g$.

In an embodiment, a specific surface area ratio of the second lithium metal oxide particles relative to the first lithium metal oxide particles may be in a range from 0.07 to 3.3, preferably from 0.3 to 1.3, more preferably from 0.5 to 0.8.

In an embodiment, a hardness ratio of the second lithium metal oxide particles relative to the first lithium metal oxide particles may be in a range from 1.25 to 2.75, preferably from 1.5 to 2.5, more preferably from 2.25 to 2.5.

In an embodiment, an electrode density of the cathode 100 may be 3.5 g/cc or more, 3.7 g/cc or more, or 3.9 g/cc or more.

For example, the electrode density may be increased by increasing a pressing density when manufacturing the electrode. However, when the pressing density is increased, more cracks may be formed in the lithium metal oxide particles (e.g., the secondary particles), and the area of the cracks may be increased during repeated charging and discharging of the lithium secondary battery. However, the cathode according to embodiments of the present invention satisfies Equation 1 and Equation 2 above, so that the crack generation may be reduced even though the electrode density is increased.

In an embodiment, each of the first lithium metal oxide particle and the second lithium metal oxide particle may contain nickel.

In some embodiments, each of the first lithium metal oxide particle and the second lithium metal oxide particle may further contain cobalt, manganese, aluminum, etc.

For example, a concentration of nickel may refer to a mol % of nickel calculated based on the total number of moles of all elements excluding lithium and oxygen.

In an embodiment, the concentration of nickel in the first lithium metal oxide particles may be 85 mol % or more, preferably 88 mol % or more, and more preferably 90 mol % or more.

For example, if the content of nickel in the lithium metal oxide particles becomes higher, the capacity of the lithium secondary battery may be improved. However, when the lithium secondary battery is repeatedly charged and discharged, a volume change in a c-axis direction according to the intercalation and deintercalation of lithium becomes greater, and cracks may easily occur in the particles. Accordingly, the high-temperature life-span properties of the lithium secondary battery may be deteriorated.

However, the cathode according to embodiments of the present invention includes both the first lithium metal oxide particle and the second lithium metal oxide particle, and satisfies Equation 1 and Equation 2, so that the above-described defects may be effectively prevented.

In an embodiment, a concentration of nickel in the first lithium metal oxide particles may be greater than a concentration of nickel in the second lithium metal oxide particles.

In some embodiments, a difference between the concentrations of nickel in the first lithium metal oxide particle and the second lithium metal oxide particle may be in a range from 1 mol % to 20 mol %, preferably from 1 mol % to 15 mol %, more preferably from 3 mol % to 10 mol %. Within the above range, the capacity and high-temperature life-span properties of the lithium secondary battery may be further improved.

In an embodiment, the first lithium metal oxide particle may include a chemical structure represented by Chemical Formula 1 below.

$$\text{Li}_{x1}\text{Ni}_{(1-a1-b1)}\text{Co}_{a1}\text{M1}_{b1}\text{O}_{y1} \qquad \text{[Chemical Formula 1]}$$

In Chemical Formula 1, M1 includes at least one element from Al, Zr, Ti, Cr, B, Mg, Mn, Ba, Si, Y, W and Sr, $0.9 \leq x1 \leq 1.2$, $1.9 \leq y1 \leq 2.1$, and $0 \leq a1+b1 \leq 0.15$.

In some embodiments, $0 < a1+b1 \leq 0.12$ or $0 < a1+b1 \leq 0.1$.

In an embodiment, the second lithium metal oxide particle may include a chemical structure represented by Chemical Formula 2 below.

$$\text{Li}_{x2}\text{Ni}_{(1-a2-b2)}\text{Co}_{a2}\text{M2}_{b2}\text{O}_{y2} \qquad \text{[Chemical Formula 2]}$$

In Chemical Formula 2, M2 includes at least one element from Al, Zr, Ti, Cr, B, Mg, Mn, Ba, Si, Y, W and Sr, $0.9 \leq x2 \leq 1.2$, $1.9 \leq y2 \leq 2.1$, and $0 \leq a2+b2 \leq 0.5$.

In some embodiments, $0.05 \leq a2+b2 \leq 0.4$, $0.05 \leq a2+b2 \leq 0.3$, $0.1 \leq a2+b2 \leq 0.3$, $0.05 \leq a2+b2 \leq 0.2$, or $0.1 \leq a2+b2 \leq 0.2$.

In an embodiment, $0.01 \leq (a2+b2)-(a1+b1) \leq 0.20$, preferably $0.01 \leq (a2+b2)-(a1+b1) \leq 0.15$, more preferably $0.01 \leq (a2+b2)-(a1+b1) \leq 0.10$, or $0.03 \leq (a2+b2)-(a1+b1) \leq 0.10$.

Within this range, the capacity and high-temperature lifespan properties of the lithium secondary battery may be further improved.

In an embodiment, each of the first lithium metal oxide particle and the second lithium metal oxide particle may further include a coating element or a doping element. For example, the coating element or the doping element may include Al, Ti, Ba, Zr, Si, B, Mg, P, Sr, W, La, an alloy thereof, or an oxide thereof.

Figures 3, 4:
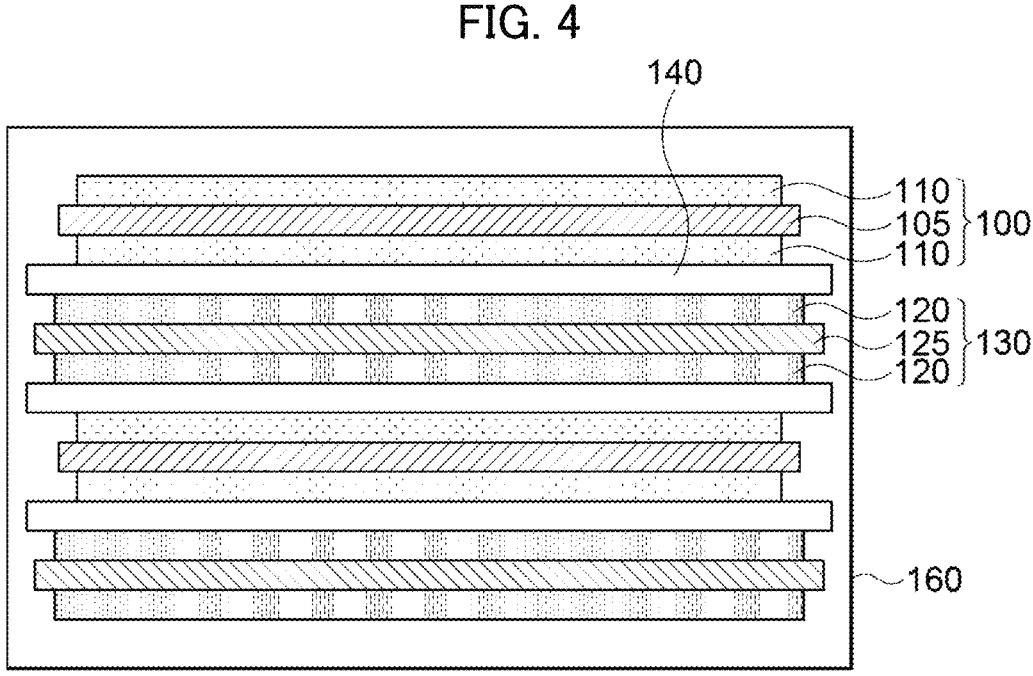
FIG. 3 is a plan view schematically illustrating a lithium secondary battery in accordance with exemplary embodiments.
FIG. 4 is a schematic cross-sectional view of a lithium secondary battery in accordance with exemplary embodiments.

FIGS. 3 and 4 are a schematic plan view and a cross-sectional view, respectively, illustrating a lithium secondary battery according to exemplary embodiments. FIG. 4 is a cross-sectional view taken along a line I-I' of FIG. 3.

Referring to FIGS. 3 and 4, the lithium secondary battery includes the above-described cathode 100 for a lithium secondary battery and an anode 130 facing the cathode 100.

For example, the anode 130 may include an anode current collector 125 and an anode active material layer 120 formed on at least one surface of the anode current collector 125.

For example, the anode active material layer 120 includes an anode active material, and may further include an anode binder and a conductive material.

For example, an anode slurry may be prepared by mixing and stirring the anode active material, the anode binder and the conductive material in a solvent. The anode slurry may be coated on the anode current collector 125, and dried and pressed to form the anode 130.

The anode current collector 125 may include, e.g., gold, stainless steel, nickel, aluminum, titanium, copper or an alloy thereof.

For example, the anode active material may include a material which may be capable of adsorbing and ejecting lithium ions. For example, the anode active material may include a lithium alloy, a carbon-based material, a silicon (Si)-based compound, etc. These may be used alone or in a combination thereof.

The lithium alloy may further include aluminum, zinc, bismuth, cadmium, antimony, silicon, lead, tin, gallium, indium, etc.

For example, the carbon-based active material may include a crystalline carbon, an amorphous carbon, a carbon composite, a carbon fiber, etc.

The amorphous carbon may include a hard carbon, cokes, a mesocarbon microbead (MCMB), a mesophase pitch-based carbon fiber (MPCF), etc.

The crystalline carbon may include a graphite-based material such as natural graphite, artificial graphite, graphitized cokes, graphitized MCMB, graphitized MPCF, etc.

In an embodiment, the anode active material may include the silicon-based active material. For example, the silicon-based active material may include Si, SiOx (0<x<2), Si/C, SiO/C, Si-Metal, etc. In this case, the lithium secondary battery having higher capacity may be achieved.

In an embodiment, a content of silicon atoms in a total weight of the anode active material layer 120 may be in a range from 1 wt % to 30 wt %, from 1 wt % to 20 wt %, from 5 wt % to 20 wt %, or from 10 wt % to 20 wt %.

The anode binder and the conductive material substantially the same as or similar to those used for forming the cathode may also be used. In some embodiments, the anode binder may include an aqueous binder, e.g., styrene-butadiene rubber (SBR), and carboxymethyl cellulose (CMC) may also be used as a thickener.

In an embodiment, a separation layer 140 may be interposed between the anode 100 and the cathode 130.

In some embodiments, an area of the anode 130 may be greater than that of the cathode 100. Thus, lithium ions generated from the cathode 100 may be easily transferred to the anode 130 without a loss by, e.g., precipitation or sedimentation.

The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

For example, an electrode cell may be defined by the cathode 100, the anode 130 and the separation layer 140.

For example, a plurality of the electrode cells may be stacked to form an electrode assembly 150. For example, the electrode assembly 150 may be formed by winding, laminating or z-folding the separation layer 140.

The lithium secondary battery according to exemplary embodiments may include a cathode lead 107 connected to the cathode 100 to protrude to an outside of a case 160, and an anode lead 127 connected to the anode 130 to protrude to the outside of the case 160.

For example, the cathode 100 and the cathode lead 107 may be electrically connected with each other. The anode 130 and the anode lead 127 may be electrically connected with each other.

For example, the cathode lead 107 may be electrically connected to the cathode current collector 105. The anode lead 130 may be electrically connected to the anode current collector 125.

For example, the cathode current collector 105 may include a cathode tab 106 protruding at one side thereof. The cathode active material layer 110 may not be formed on the cathode tab 106. The cathode tab 106 may be integral with the cathode current collector 105 or may be connected to the cathode current collector 105 by, e.g., welding.

The cathode current collector 105 and the cathode lead 107 may be electrically connected via the cathode tab 106.

For example, the anode current collector 125 may include an anode tab 126 protruding at one side thereof. The anode active material layer 120 may not be formed on the anode tab 126. The anode tab 126 may be integral with the anode current collector 125 or may be connected to the anode current collector 125 by, e.g., welding.

The anode electrode current collector 125 and the anode lead 127 may be electrically connected via the anode tab 126.

In an embodiment, the electrode assembly 150 may include a plurality of the cathodes and a plurality of the anodes. For example, each of the plurality of the cathodes may include the cathode tab. For example, each of the plurality of the anodes may include the anode tab.

In an embodiment, the cathode tabs (or the anode tabs) may be laminated, compressed or welded to form a cathode tab stack (or an anode tab stack). The cathode tab stack may be electrically connected to the cathode lead 107, and the anode tab stack may be electrically connected to the anode lead 127.

For example, the electrode assembly 150 may be accommodated together with the electrolyte in the case 160 to form the lithium secondary battery.

For example, the electrolyte may include a lithium salt, and an organic solvent optionally with an additive.

For example, the lithium salt may be expressed as $Li^+X^-$. The anion of the lithium salt $X^-$ be at least one of, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN^-$ and $(CF_3 CF_2SO_2)_2N^-$, etc.

For example, the lithium salt may include at least one of $LiBF_4$, $LiPF_6$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc.

For example, the additive may include a fluorine-containing carbonate-based compound, a vinylidene carbonate-based compound, a fluorine-containing lithium phosphate-based compound, a sultone-based compound, a sulfate-based compound, a borate-based compound, a nitrile-based compound, an amine-based compound, a silane-based compound, a benzene-based compound, etc. These may be used alone or in a combination thereof.

For example, the fluorine-containing carbonate-based compound may include fluoroethylene carbonate (FEC).

For example, the vinylidene carbonate-based compound may include vinylene carbonate (VC), vinylethylene carbonate (VEC), etc.

For example, the fluorine-containing lithium phosphate-based compound may include at least one of lithium difluoro phosphate ($LiPO_2F_2$), lithium difluoro (bisoxalato) phosphate, etc.

For example, the sultone-based compound may include 1,3-propane sultone (PS), 1,4-butane sultone, ethenesultone, 1,3-propene sultone (PRS), 1,4-butene sultone, 1-methyl-1, 3-propene sultone, etc.

For example, the sulfate-based compound may include ethylene sulfate (ESA), trimethylene sulfate (TMS), methyltrimethylene sulfate (MTMS), etc.

For example, the borate-based compound may include lithium tetraphenyl borate, lithium difluoro(oxalato)borate (LiODFB), etc.

For example, the nitrile-based compound may include succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, etc.

For example, the amine-based compound may include triethanolamine, ethylene diamine, etc.

For example, the silane-based compound may include tetravinyl silane.

For example, the benzene-based compound may include monofluorobenzene, difluorobenzene, trifluorobenzene, tetrafluorobenzene, etc.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

PREPARATION EXAMPLES

Preparation Example 1-1: Preparation of Lithium Metal Oxide SP1 in the Form of Secondary Particle A mixed solution was prepared by adding $NiSO_4$, $CoSO_4$ and $MnSO_4$ at a molar ratio of 85:10:5 in distilled water from which internal dissolved oxygen was removed The mixed solution, NaOH (precipitating agent) and $NH_4OH$ (chelating agent) were put into a reactor, and co-precipitation was performed for 30 hours to prepare metal hydroxide particles ($Ni_{0.85}Co_{0.1}Mn_{0.05}(OH)_2$).

The metal hydroxide particle was dried at 80° C. for 12 hours and then re-dried at 110° C. for 12 hours.

A mixture was prepared by adding lithium hydroxide and the metal hydroxide particles to a dry high-speed mixer so that a molar ratio was 1:1.03.

The mixture was put into a firing furnace and heated to 700° C. at a rate of 2° C./min, and maintained at 700° C. for 10 hours. An oxygen gas was continuously passed through at a flow rate of 10 mL/min during raising and maintaining the temperature of the firing furnace.

After the firing, natural cooling to room temperature, pulverization and classification were performed to obtain lithium metal oxide particles ($LiNi_{0.85}Co_{0.1}Mn_{0.05}O_2$) of Preparation Example 1-1 having a secondary particle shape in which primary particles were agglomerated.

Preparation Example 1-2: Preparation of Lithium Metal Oxide SP2 in the Form of Secondary Particles Lithium metal oxide particles having physical properties shown in Table 1 below were prepared by modifying the co-precipitation reaction time, the firing temperature and the firing time from those of Preparation Example 1-1.

Preparation Example 1-3: Preparation of Lithium Metal Oxide SP3 in the Form of Secondary Particles Lithium metal oxide particles having physical properties shown in Table 1 below were prepared by modifying the co-precipitation reaction time, the firing temperature and the firing time from those of Preparation Example 1-1.

Preparation Example 2-1: Preparation of Lithium Metal Oxide MP1 in the Form of Single Particle A mixed solution was prepared by adding $NiSO_4$, $CoSO_4$ and $MnSO_4$ at a molar ratio of 8:1:1 in distilled water from which internal dissolved oxygen was removed The mixed solution, NaOH (precipitating agent) and $NH_4OH$ (chelating agent) were put into a reactor, and co-precipitation was performed for 72 hours to prepare metal hydroxide particles ($Ni_{0.8}Co_{0.1}Mn_{0.1}(OH)_2$).

The metal hydroxide particle was dried at 100° C. for 12 hours and then re-dried at 120° C. for 12 hours.

A mixture was prepared by adding lithium hydroxide and the metal hydroxide particles to a dry high-speed mixer so that a molar ratio was 1:1.03.

The mixture was put into a firing furnace and heated to 980° C. at a rate of 2° C./min, and maintained at 980° C. for 12 hours. An oxygen gas was continuously passed through at a flow rate of 10 mL/min during raising and maintaining the temperature of the firing furnace.

After the firing, natural cooling to room temperature, pulverization and classification were performed to obtain lithium metal oxide particles ($LiNi_{0.8}Co_{0.1}Mn_{0.1}O_2$) of Preparation Example 2-1 having a single particle shape.

Preparation Example 2-2: Preparation of Lithium Metal Oxide MP2 in the Form of Single Particle Lithium metal oxide particles having physical properties shown in Table 1 below were prepared by modifying the co-precipitation reaction time, the firing temperature and the firing time from those of Preparation Example 2-1.

Preparation Example 2-2: Preparation of Lithium Metal Oxide MP3 in the Form of Single Particle Lithium metal oxide particles having physical properties shown in Table 1 below were prepared by modifying the co-precipitation reaction time, the firing temperature and the firing time from those of Preparation Example 2-1.

Evaluation of Physical Properties of Lithium Metal Oxide Particles (1) Average Particle Diameter (D50)

Average particle diameters (D50) of the lithium metal oxide particles of Preparation Examples were measured.

The average particle diameter (D50) is defined as a particle diameter at 50% of a volume cumulative particle diameter distribution, and was measured according to a laser diffraction method (microtrac MT 3000).

(2) Specific Surface Area of Particles

Specific surface areas of the lithium metal oxide particles of Preparation Examples were measured.

The specific surface area was measured according to a gas adsorption/desorption method using a BET measuring instrument (Micromeritics, ASAP2420).

(3) Particle Hardness

Particle hardness of the lithium metal oxide particles of Preparation Examples was measured.

After randomly selecting 10 particles and measuring an intensity of each particle, an average value was calculated. The particle hardness was measured using a Micro Compression Tester (simadzu, MCT-W500-E).

TABLE 1

| | particle diameter ($D_{50}$) (μm) | BET ($m^2$/g) | particle hardness (Mpa) |
|---|---|---|---|
| Preparation Example 1-1 (SP1) | 15.8 | 0.60 | 107 |
| Preparation Example 1-2(SP2) | 11.0 | 1.06 | 110 |
| Preparation Example 1-3(SP3) | 18.0 | 0.40 | 96 |
| Preparation Example 2-1(MP1) | 5.4 | 0.34 | 243 |
| Preparation Example 2-2(MP2) | 3.0 | 0.8 | 271 |
| Preparation Example 2-3(MP3) | 7.5 | 0.25 | 153 |

Examples and Comparative Examples (1) Fabrication of Cathode

A cathode active material formed by mixing the lithium metal oxide particles of Preparation Examples as shown in Table 2 below, carbon black and polyvinylidene fluoride were dispersed in N-methyl-2-pyrrolidone in a weight ratio of 92:5:3 to prepare a cathode slurry.

The cathode slurry was coated on an area of an aluminum foil (thickness: 15 μm) having a protrusion (a cathode tab) at one side thereof except for the protrusion, and then dried and pressed to form a cathode. A cathode density was 3.5 g/cc.

(2) Fabrication of Lithium Secondary Battery Sample

An anode slurry was prepared by dispersing an anode active material in which artificial graphite and natural graphite were mixed in a weight ratio of 7:3, SBR and carboxymethyl cellulose (CMC) in distilled water by a weight ratio of 97:1:2.

The anode slurry was uniformly coated on an area of a copper foil (thickness: 15 μm) having a protrusion (an anode tab) at one side thereof except for the protrusion, and then dried and pressed to form an anode.

A polyethylene separation layer (thickness: 20 μm) was interposed between the cathode and the anode to form an electrode assembly. Thereafter, a cathode lead and an anode lead were welded and connected to the cathode tab and the anode tab, respectively.

As the electrolyte, a 1M LiPF6 solution (in a mixed solvent of EC/EMC by a volume ratio of 30:70) was prepared. Further, 1 wt % of FEC (fluoroethylene carbonate), 0.3 wt % of VC (vinylethylene carbonate), 1.0 wt % of $LiPO_2F_2$ (lithium difluorophosphate) 1.0 wt %, 0.5 wt % of PS (1,3-propane sultone) and 0.5 wt % of PRS (prop-1-ene-1,3-sultone) were added based on 100 wt % of the electrolyte.

The electrode assembly was accommodated in a pouch (case) so that portions of the cathode lead and the anode lead were exposed to an outside, and three sides except for an electrolyte injection side were sealed.

The electrolyte was injected into the pouch and sealed the electrolyte injection side to prepare a lithium secondary battery sample.

Experimental Example (1) Morphological Analysis of Cathode Active Material Layer 0.5 C CC/CV charging (4.2V 0.05 C CUT-OFF) and 0.5 C CC discharging (2.7V CUT-OFF) were repeated 10 times at 45° C. for the lithium secondary batteries of Examples and Comparative Examples.

The lithium secondary batteries of Examples and Comparative Examples after the charging and discharging were disassembled to separate the cathodes. The cathode was cut in a stacking direction of the cathode active material layer along a minor axis direction line of the cathode passing through a middle point of the cathode (see dotted line in FIG. 3).

A cross-section of the cathode active material layer was measured using a scanning electron microscope (SEM) at a magnification of 1000 times.

Based on the SEM cross-sectional image, the values of Equations 1 and 2 below were calculated.

$$A_2/(A_1+A_2) \qquad \text{[Equation 1]}$$

$$A_C/A_1 \qquad \text{[Equation 2]}$$

In Equations 1 and 2, A1 is an area of a secondary particle, $A_2$ is an area of a single particle, and $A_C$ is defined as an area of cracks in the secondary particle.

Each area was measured by analyzing SEM images using Image J program.

More specifically, the crack area $A_C$ of the secondary particles was measured using a contrast difference. Additionally, the area A1 of the secondary particle and the area A2 of the single particle were determined by checking a circumference of the particle, and measuring entire areas within the circumference were measured.

(2) Evaluation on High-Temperature Capacity Retention of Lithium Secondary Batteries The lithium secondary batteries of Examples and Comparative Examples were subjected to 0.5 C CC/CV charging (4.2V, 0.05 C CUT-OFF) and 0.5 C CC discharging (2.7V CUT-OFF) at 45° C. three times, and a discharge capacity at the 3rd cycle C3 was measured.

The lithium secondary batteries of Examples and Comparative Examples were repeatedly charged and discharged 500 times, and the 500th discharge capacity $C_{500}$ was measured.

A capacity retention was calculated according to the following equation.

$$\text{Capacity retention } (\%)=C_{500}/C_3\times100(\%)$$

(3) Evaluation on High-Temperature Gas Generation of Lithium Secondary Batteries The lithium secondary batteries of Examples and Comparative Examples were repeatedly charged and discharged 500 times according to (2) above.

A hole was drilled at a bottom of the pouch of each lithium secondary battery of Examples and Comparative Examples after the charging and discharging, and a gas generation was measured using a gas chromatography (GC).

An amount of the gas generation was calculated according to the following equation with reference to the amount of the gas generation in Comparative Example 1.

$$\text{Amount of gas generation } (\%)=(\text{amount of gas generation/amount of gas generation in Comparative Example 1})\times100(\%)$$

Referring to Table 2, the lithium secondary batteries of Examples provided improved capacity retention and reduced gas generation at high temperature compared to those from the lithium secondary batteries of Comparative Examples.

What is claimed is:

1. A cathode for a lithium secondary battery, comprising:

a cathode current collector; and a cathode active material layer formed on the cathode current collector, wherein the cathode active material layer comprises first lithium metal oxide particles each having a secondary particle shape in which primary particles are aggregated and second lithium metal oxide particles each having a single particle shape, and satisfies Equations 1 and 2:

$$40\leq[A_2/(A_1+A_2)]\times100\leq98 \qquad \text{[Equation 1]}$$

$$A_C/A_1\times100\leq2 \qquad \text{[Equation 2]}$$

wherein, in Equations 1 and 2, $A_1$ is a total cross-sectional area within a circumference of the first lithium metal oxide particles measured from a scanning electron microscope (SEM) cross-sectional image of the cathode active material layer at a magnification of 1000 times, $A_2$ is a total cross-sectional area within a circumference of the second lithium metal oxide particles measured from the SEM cross-sectional image at a magnification of 1000 times, and $A_C$ is a total cross-sectional area of cracks in the first lithium metal oxide particles measured from the SEM cross-sectional

TABLE 2

| | secondary particle | single particle | mixing weight ratio secondary particle:single particle | Equation 1 value | Equation 2 value | high temperature capacity retention (%) | high temperature gas generation (%) |
|---|---|---|---|---|---|---|---|
| Example 1 | SP1 | MP1 | 60:40 | 42.8 | 1.5 | 92 | 52 |
| Example 2 | SP1 | MP1 | 50:50 | 48.7 | 1 | 93 | 43 |
| Example 3 | SP1 | MP1 | 40:60 | 56.9 | 0.8 | 90 | 41 |
| Example 4 | SP1 | MP1 | 30:70 | 68.9 | 0.5 | 89 | 38 |
| Example 5 | SP1 | MP1 | 20:80 | 81.5 | 0.4 | 87 | 37 |
| Example 6 | SP1 | MP1 | 10:90 | 92.1 | 0.4 | 85 | 36 |
| Comparative Example 1 | SP1 | MP1 | 100:0 | 0 | 3.2 | 75 | 100 |
| Comparative Example 2 | SP1 | MP1 | 0:100 | 100.0 | — | 75 | 36 |
| Comparative Example 3 | SP1 | MP1 | 80:20 | 18.9 | 2.8 | 81 | 89 |
| Comparative Example 4 | SP1 | MP1 | 70:30 | 32.7 | 2.4 | 85 | 81 |
| Comparative Example 5 | SP2 | MP1 | 50:50 | 51.0 | 2.5 | 83 | 70 |
| Comparative Example 6 | SP3 | MP1 | 50:50 | 48.3 | 2.7 | 80 | 75 |
| Comparative Example 7 | SP1 | MP2 | 50:50 | 52.0 | 2.1 | 81 | 69 |
| Comparative Example 8 | SP1 | MP3 | 50:50 | 49.2 | 3 | 79 | 73 | image at a magnification of 1000 times, and each of $A_1$, $A_2$, and $A_C$ are measured by analyzing the SEM cross-sectional images using Image J program.

2. The cathode for a lithium secondary battery of claim 1, wherein each of the first lithium metal oxide particles and the second lithium metal oxide particles contains nickel, and a concentration of nickel in the first lithium metal oxide particles is greater than a concentration of nickel in the second lithium metal oxide particles.

3. The cathode for a lithium secondary battery of claim 2, wherein a difference between the concentrations of nickel in the first lithium metal oxide particles and the second lithium metal oxide particles is in a range from 1 mol % to 20 mol %.

4. The cathode for a lithium secondary battery of claim 2, wherein the concentration of nickel in the first lithium metal oxide particles is 85 mol % or more based on a total number of moles of all elements except for lithium and oxygen.

5. The cathode for a lithium secondary battery of claim 1, wherein an average particle diameter of the first lithium metal oxide particles is in a range from 10 μm to 20 μm, and an average particle diameter of the second lithium metal oxide particles is in a range from 3 μm to 10 μm.

6. The cathode for a lithium secondary battery of claim 1, wherein a ratio of an average particle diameter of the second lithium metal oxide particles relative to an average particle diameter of the first lithium metal oxide particles is in a range from 0.2 to 0.5.

7. The cathode for a lithium secondary battery of claim 1, wherein a specific surface area of the first lithium metal oxide particles is in a range from 0.3 $m^2$/g to 1.3 $m^2$/g, and a specific surface area of the second lithium metal oxide particles is in a range from 0.1 $m^2$/g to 1 $m^2$/g.

8. The cathode for a lithium secondary battery of claim 1, wherein a ratio of specific surface areas of the second lithium metal oxide particles relative to the first lithium metal oxide particles is in a range from 0.3 to 1.3.

9. The cathode for a lithium secondary battery of claim 1, wherein a hardness ratio of the second lithium metal oxide particles relative to the first lithium metal oxide particles is in a range from 1.5 to 2.5.

10. The cathode for a lithium secondary battery of claim 1, wherein the cathode has an electrode density of 3.5 g/cc or more.

11. The cathode for a lithium secondary battery of claim 1, wherein $[A_2/(A_1+A_2)] \times 100 > 50$.

12. The cathode for a lithium secondary battery of claim 1, wherein $A_C/A_1 \times 100 < 1$.

13. A lithium secondary battery, comprising:

the cathode of claim 1; and an anode facing the cathode.

14. The lithium secondary battery of claim 13, wherein the anode comprises an anode current collector and an anode active material layer formed on at least one surface of the anode current collector, and the anode active material layer includes a silicon-based active material.

15. The lithium secondary battery of claim 14, wherein a content of silicon atoms is in a range from 1 wt % to 20 wt % based on a total weight of the anode active material layer.

* * * * *